June 7, 1938.　　　　N. D. CAMPBELL　　　　2,119,735
TIRE INFLATING AND VENTILATING DEVICE
Filed Dec. 20, 1935　　　2 Sheets-Sheet 1
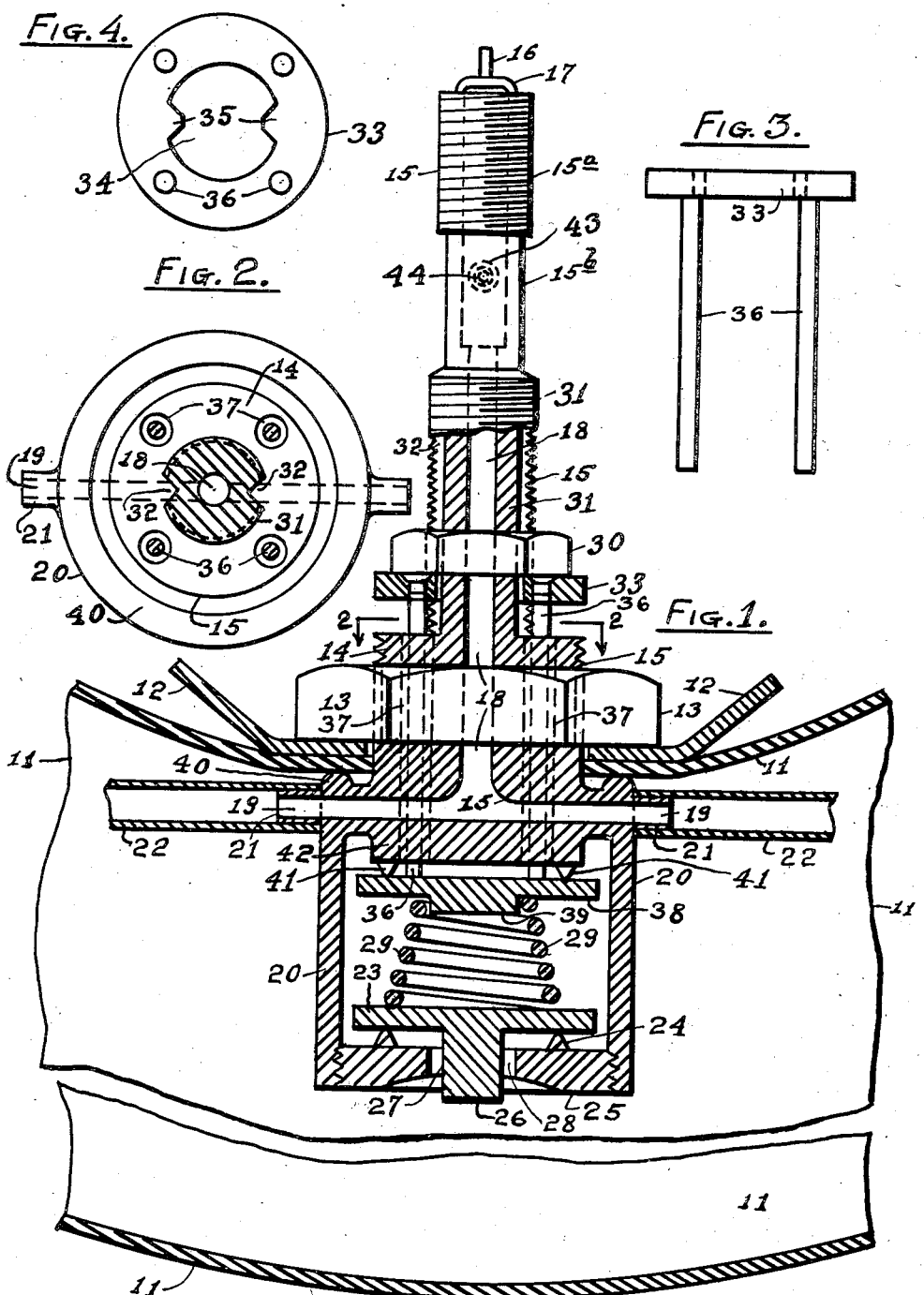
INVENTOR
Nicholas Demarest Campbell
BY
Israel Benjamin's
ATTORNEY

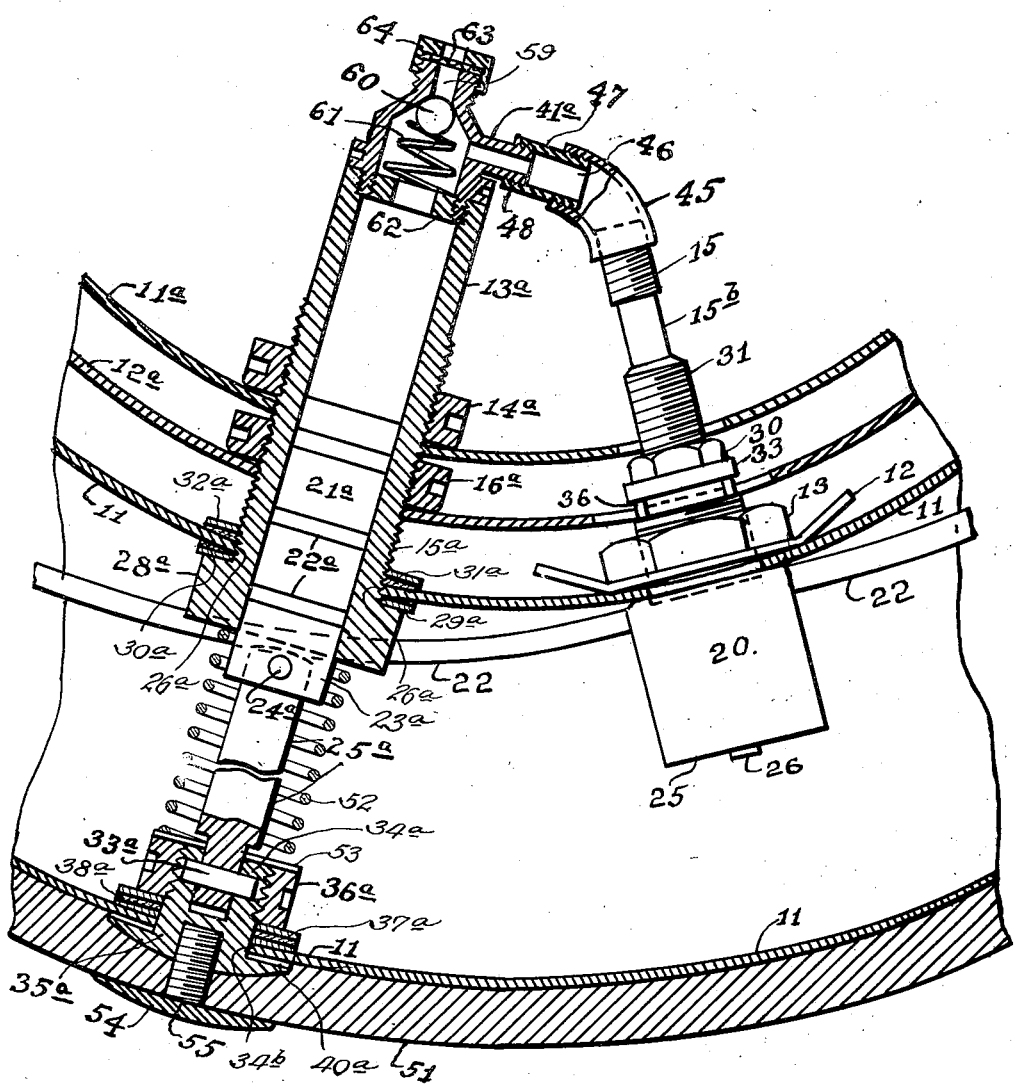

Patented June 7, 1938

2,119,735

UNITED STATES PATENT OFFICE 2,119,735

TIRE INFLATING AND VENTILATING DEVICE

Nicholas Demarest Campbell, Hackensack, N. J.

Application December 20, 1935, Serial No. 55,316

5 Claims. (Cl. 152—426)

My invention relates to improvements in a combined tire inflating and ventilating device, and it consists in the novel features, which are hereinafter more fully described.

One of the objects of my invention is to provide a means for automatically and continually replacing the compressed air in the inner tubes of automobile tires during the motion of the automobile, and also to replace the air in the tube when the automobile is stationary.

Another object of my invention is to accomplish the above result without having too many openings cut in the inner tube and preferably without any additional openings besides the one which is at present employed for inserting therethrough one end of the air inlet fitting.

A further object of my invention is to provide automatic regulating means to maintain a constant pressure of the compressed air in the inner tube of a pneumatic tire.

Another object of my invention is to prevent overinflation or excessive pressure in the inner tube of an automobile tire.

A further object of my invention is to prevent overheating of the tires in automobiles.

Other objects and advantages will hereinafter appear.

I attain these objects by the devices illustrated in the accompanying drawings or by any mechanical equivalents or obvious modifications of the same.

In the drawings Fig. 1 is a fragmentary vertical section of my device in the plane of the automobile tire, showing sundry parts in elevation.

Fig. 1a is a fragmentary view partly in elevation and partly in section of a modification of my device including an inflating means which is hereinafter described.

Fig. 2 is a section on the line 2—2 of Fig. 1 looking in the direction of the arrows and omitting the tire.

Fig. 3 is a detail in side elevation of a multiple prong member which is hereinafter described; and Fig. 4 is a bottom plan view of the same.

Similar numerals refer to similar parts throughout the several views:

11 designates the inner tube of an automobile tire which is shown in Fig. 1 as drawn to a larger scale than its actual size and is shown as having a part thereof broken away, and 12 is a clamping washer in contact with a portion of the outer side of the inner periphery of the tire 11; the washer 12 may be of any standard or special design and is shown as having therein a central opening which is larger than usual, to encompass the neck 14 of a combined inlet and exhaust fitting 15, which terminates at the inner end thereof in a casing 20 which is shown as positioned in the tube 11 and has thereon a bead 40 which is in contact with a portion of the inner side of the inner periphery of the tube 11 which is held therebetween and said clamp 12, which is held in place by a nut 13 which is in engagement with a threaded portion of said neck 14.

The outer end 15a of the fitting 15 is shown in elevation; it is substantially the same as the outer end of any standard air inlet fitting and is provided with the usual spring pressed check valve the larger part of which is enclosed therein; only part of the pin 16 and yoke 17 thereof are shown as extending from said end 15a. The portion 15b of the fitting 15 has thereon at the rear thereof a hub 43 for connecting the same by means of a nipple 44 to a pressure gauge, which is not shown.

A longitudinal central opening 18 extends inwardly from the outer end 15a of the fitting 15, passes through the neck 14 and terminates in a channel 19 which is disposed transversely to the opening 18 and extends in opposite directions through the outer end 42 of the casing 20 which is provided with a pair of spigots 21, one at each end of said channel 19. The channel 19 may have only one opening, and only one spigot 21 may be used, if desired.

Each spigot 21 serves for connecting thereto one end of each of a pair of rubber pipes 22, which are disposed in the interior of the inner tube 11 and in the plane of the latter.

The pipes 22 extend in a direction away from the spigots 21 and are shown in Fig. 1 as broken away; the pipes 22 are to be long enough to discharge the compressed air which passes therethrough at a point in the inner tube which is nearly diametrically opposite to the place where the fitting 15 enters the tube 11.

The spigots 21 may preferably be ribbed or corrugated, to hold the adjacent ends of the pipes 22 more securely, as is usual in connections of detachable flexible rubber tubing, gas pipes and the like. The pipes 22 may be replaced by suitable passages moulded in the tube, and provided with short loose nipples for connecting the passages to spigots 21. Only one pipe 22 may be used, if desired.

It will be understood that the above-described connection of the hub 43 to a pressure gauge has thereon a suitable stop means such as a petcock or valve.

The casing 20 encloses a valve or lid 23 which is pressed inwardly by a spring 29 and contacts with a bead 24 which is integral with a closure 25 which is shown at the inner end of the casing 20; the lid 23 terminates at the inner end thereof in a pilot pin 26 which is integral therewith and passes through an opening 27 in the closure 25.

The opening 27 is larger than the pin 26, which is guided therein by ribs 28, which permit air to pass therebetween to the underside of the lid 23 which forms an air tight joint with said bead 24 and prevents the passage of air from the interior of the tube 11 into the casing 20 as long as the pressure of the air in said tube 11 does not exceed a desired intensity, which is determined by the pressure of the said spring 29 which has its inner end abutting against the lid 23.

The pressure of the spring 29 is regulated by a nut 30 which is in engagement with a threaded stem 31 which forms part of said fitting 15; the nut 30 is in contact with a pressure plate 33.

The stem 31 extends outwardly from the said neck 14 and is shown in Fig. 2 as fluted by means of grooves 32 on the sides thereof.

The pressure plate 33 is shown in Fig. 4 as having therein an inner opening 34, which is adapted to pass over the stem 31, and inwardly extending spurs 35 at said opening 34, to slidably fit said grooves 32, thereby preventing rotation of said plate 33 on the stem 31.

Multiple prongs 36 are secured to the plate 33 and are shown as extending inwardly therefrom through exhaust passages 37 in said neck 15, which extend to the interior of the casing 20. The number of prongs may be other than as shown; and only one prong may be used if desired.

The inner ends of said prongs 36 are shown as abutting against the outer side of a spring plate 38 which abuts and presses against the outer end of said spring 29; the plate 38 has thereon on the inner side thereof a knob 39 extending into the outer coil of said spring 29.

By turning the nut 30 in a direction to move it inwardly, the pressure from the nut is transmitted by said plate 33 and prongs 36 to the plate 38 and spring 29, and the pressure of the latter is transmitted to the lid 23, thereby preventing the ingress into the casing 20 of air from the tube 11 below a desired intensity of pressure.

When the pressure of the air in the interior of the tube 11 exceeds a desired intensity as predetermined by the position of said nut 30, the lid 23 is forced outwardly from the bead 24, and some air from the tire escapes through the interior of said casing 20 and the exhaust passages 37 to the atmosphere.

Air may automatically be compressed into the tube 11 by means of an automatic inflator such as shown in Fig. 1a and described in my Patent No. 2,084,381, dated June 22, 1937, or by any other automatic inflator.

In Fig. 1a—11a designates the felly of an automobile wheel and 12a the demountable rim of the same.

A cylinder 13a is shown as passing through an opening in the felly 11a and through another opening in the rim 12a and is radially disposed with relation to the wheel.

A nut 14a is shown in engagement with a threaded part 15a on the outer periphery of the cylinder 13a, and is abutting at the end thereof against the inner periphery of the felly 11a; another nut 16a is also in engagement with the threaded part 15a and is abutting against the inner periphery of the rim 12a. The nuts 14a and 16a are keeping the cylinder 13a in position to prevent longitudinal displacement of the cylinder 13a.

A piston or plunger 21a, having thereon resilient packing rings 22a, is slidably positioned in the interior of the cylinder 13a to reciprocate therein.

The piston 21a terminates at the outer end thereof in a bifurcation 23a which is shown as pivotally connected by means of a pin 24a to the inner end of a connecting rod 25a, which is shown as broken away at the middle part thereof to indicate that connecting rods of different lengths may be employed, if desired.

The outer end of the cylinder 13a passes through an opening 26a in the inner periphery of the inner tube 11 of a pneumatic tire and has thereon a flanged head 28a, which is disposed interiorly of the said tube 11 and has the inner annular end thereof abutting against a metal washer 29a, which is thereby pressed against an annular packing 30a, which is interposed between the washer 29a and the inner surface of the inner periphery of the tube 11, whereby leakage is prevented through the opening 26a.

Another annular packing 31a is placed in contact with the outer surface of the inner periphery of the tube 11, and another annular metal washer 32a is interposed between the packing 31a and the inner side of the flanges of the shoe 51 which rest on the outer periphery of the rim 12a, to protect the inner tube 11 against wear and also to assist in preventing leakage.

The outer end of the rod 25a is pivotally connected by means of a pin 33a to an exteriorly threaded plug 34a, which extends inwardly through an opening 34b in the outer periphery of the tube 11 and terminates in a flanged head or plate 35a, which is positioned exteriorly to the tube 11.

The pins 24a and 33a are disposed in planes which are perpendicular to each other, whereby the rod 25a is adapted to serve as a universal joint.

A complete universal joint may be provided for each end of the rod 25a, if desired.

The plug 34a is in threaded engagement with a nut 36a, which abuts against a metal washer 37a, which is spaced by means of a packing 38a from the inner surface of the outer periphery of the tube 11, and the washer 37a is pressed by the nut 36a against the packing 38a and the tube 11, whereby leakage of compressed air is prevented through the opening 34b.

The flanged head 35a is spaced from the outer surface of the outer periphery of the tube 11 by means of a packing 40a which is placed between the head 35a and the outer surface of the outer periphery of the tube 11.

All the hereinbefore described packings may be made of sheets of india rubber or some other suitable material.

The packing 40a serves to distribute the pressure of the flange 35a on the outer periphery of the tube 11 and also to prevent leakage through said opening 34b.

As the wheel of an automobile, which is equipped with my inflator, is rolling along on the road the flanged head 35a will receive the reaction from the road through the shoe 51 and transmit it to the connecting rod 25a, which in turn will push the piston 21a towards the inner end of the cylinder 13a, thereby compressing the air, which is contained in the latter, and discharging it through an opening in a spout 41a at the inner end of the cylinder 13a into the adjacent end 48 of a tube 47, which is shown as connected at one end thereof to the spout 41a by means of a threaded joint.

A check valve may be placed either in the cylinder adjacent the spout 41a or between the spout 41a and the end 48 of the tube 47, the check valve to close by a flow of air towards the cylinder 13a and to open by the flow of air from the cylinder 13a towards the tube 47, whereby to prevent a backflow of air from the tube 47 into the cylinder 13a when the piston 21a is moved outwardly in the cylinder 13a.

The other end 46 of the tube 47 is shown as connected by means of an elbow 45 to the outer end of said fitting 15.

The compressed air from the tube 47 passes through the fitting 15 into the inner tube 11.

The cylinder 13a, the tube 47 and the fitting 15 are all shown as positioned in the same plane and may be located in the space between two adjacent spokes of the wheel, where the space is ample for that purpose.

When the head or plate 35a has been rolled by the wheel out of the influence of the road reaction the pressure of the compressed air in the tube 11 will force the head 35a with the plug 34a thereon outwardly into contact with the shoe 51, thereby causing the rod 25a to return the piston 21a to its original position at the outer end of the cylinder 13a, thereby causing air to be inspirated into the cylinder 13a through an inlet 59 in the cylinder 13a near the inner end of the latter; the inlet 59 is controlled by a check valve 60, which is actuated by a spring 61, to prevent the escape of air through the inlet 59 during the compression stroke of the piston 21a.

The spring 61 is shown as abutting at one end thereof against the valve 60 and at the other end thereof against a collar 62 which is removably placed in the interior of the cylinder 13a near the inner end thereof.

An air strainer 63 is held by a cap 64 at the inlet 59.

For initially inflating the tube 11 the plug 34a may be moved outwardly by a spring 52, which is shown in Fig. 1a as encompassing the rod 25a and is abutting at the outer end thereof against a metal washer 53 which is placed therebetween and the plug 34a; the inner end of the spring 52 abuts against the flanged head 28a of the cylinder 13a.

The spring 52 may be omitted, if desired, and the tube 11 may then be initially filled by compressed air from an external source.

To prevent the inner surface of the shoe 51 from being worn out by the head 35a at the place of contact with the latter, I provide an attachment plate 54 which is shown in Fig. 1a as placed against the outer surface of the shoe 51, to contact with the road; the plate 54 has thereon at the inner side thereof a threaded stem 55, which is shown in Fig. 1a as extending inwardly and in engagement with an interiorly threaded portion of the plug 34a, whereby the tube 11 is connected to the shoe 51, and excessive friction is prevented between the head 35a and the inner surface of the shoe 51.

However, the attachment plate 54 with the stem 55 thereon may be omitted, if desired.

The tube 11 may also be inflated thru the fitting 15 by a hand air pump or at a service station from a compressed air supply, or in any other manner, if desired.

The outer side of the plate 38 is spaced from the inner side of the outer end 42 of the casing 20 by means of discontinuous projections 41 on the said end 42, whereby to prevent the obstruction of the inner ends of said passages 37 by said plate 38.

The compressed air from the inflator or any other source enters at the end 15a of the fitting 15, passes through the opening 18 into the channel 19 and thence into the pipes 22, through which it is carried to the part of the interior of the tube 11 which is remote from and diametrically (or nearly so) opposite to the position of the casing 20 in said tube; the compressed air is then discharged from said pipes 22 in a continuous stream which steadily replaces the used air in the interior of the tube 11 (exteriorly of said pipes 22), which used air flows in a continuous stream to the casing 20, and under the pressure imparted to it by the inflator, or any other source of compressed air, the used air overcomes the pressure of the spring 29 on the lid 23 and escapes into the casing 20 and thence through the openings 37 into the atmosphere.

In this way the interior of the tube 11 may continually be ventilated and cooled by the circulation of compressed air which circulation may be automatically maintained therein at a high degree of perfection. The tube 11 may also be ventilated occasionally and intermittently, if desired.

The air escaping past the lid 23 will produce an audible noise which may serve as a signal to pedestrians and also as evidence to the driver that the air in the tube 11 keeps circulating.

The position and size of the apertures in said modified prongs may be so designed as to produce a whistling noise by the air escaping therethrough.

In the modification of my device which is shown in Fig. 1a the fitting 15 is shown as connected by means of an elbow 45 to the exteriorly threaded end 46 of a sleeve 47, the other end of which 48 is threaded interiorly thereof and connected to the discharge end of a spout 41a at the inner end of a cylinder 13a of an inflating air compressor such as described in detail in my above mentioned pending application.

The cylinder 13a is shown in Fig. 1a as having slidably connected thereto interiorly thereof a piston 21a which has pivotally connected thereto one end of a rod 25a, the other end of which is pivotally connected to a plug 34a terminating in a flanged head or plate 35a; the latter is shown as having secured thereto an attachment plate 54, to contact with the road.

The fitting 15 is shown in Fig. 1a in elevation; the cylinder 13a with the parts connected thereto is shown in section, the same as in my above pending application.

The elbow 45 is shown partly in elevation and partly in section; the sleeve 47 is shown in section.

Variations are possible and parts of my invention may be used without other parts.

I do not, therefore, restrict myself to the details as shown in the drawings.

I claim as my invention, and desire to secure by Letters Patent:

1. The combination of a compressed air inlet fitting for admitting air into the inner tube of a pneumatic tire of a vehicle wheel from a point exteriorly of said tube, means for automatically discharging the air from said tube at a desired pressure and a means for circulating the air in said tube, thereby effectively cooling said tire, said circulating means including an automatic air compressor of rigid material on said wheel including a cylinder, a piston and means for reciprocating said piston in said cylinder, for pumping compressed air through said fitting into the said tube, an inlet on said cylinder for periodically admitting atmospheric air thereinto during the suction stroke of the piston and automatic means for periodically closing said inlet during the compression stroke of said piston, thereby preventing a backflow of air from said cylinder into the atmosphere.

2. The elements of claim 1, said fitting being adapted to prevent a backflow of compressed air therethrough into the compressor, and said circulating means including one or more conduits extending from said fitting interiorly of said tube, whereby to convey the air supplied by said circulating means and admitted through said fitting in an uninterrupted stream to a point in said tube which is remote from said fitting and simultaneously causing the air in said tube exteriorly of said conduits to flow in an uninterrupted stream to said discharging means.

3. The elements of claim 1, said compressor extending outwardly from the tire tube and being operatively connected to said wheel.

4. The elements of claim 1, combined with a means for pneumatically connecting the compressor of said circulating means to said fitting whereby to convey the compressed air from the compressor of said circulating means through said fitting to said tube during the rolling of said wheel.

5. The combination of an inlet fitting for admitting compressed air to the inner tube of an automobile tire, said fitting extending outwardly from the tire tube, means for automatically discharging the air from said tube at a desired pressure and one or more conduits extending from the inner end of said fitting interiorly of said tube, whereby to convey compressed air admitted through said fitting in an uninterrupted stream from said fitting to a point remote therefrom in said tube, to displace the air therein and to cause the displaced compressed air in said tube simultaneously to flow in an uninterrupted stream exteriorly of said conduits to said discharging means.

NICHOLAS DEMAREST CAMPBELL.